(12) United States Patent  
Kim (10) Patent No.: US 11,710,497 B2  
(45) Date of Patent: Jul. 25, 2023

(54) METHOD AND APPARATUS FOR SPEECH ANALYSIS

(71) Applicant: LG ELECTRONICS INC., Seoul (KR)

(72) Inventor: Dahae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 16/998,649

(22) Filed: Aug. 20, 2020

(65) Prior Publication Data

US 2021/0125627 A1   Apr. 29, 2021

(30) Foreign Application Priority Data

Oct. 23, 2019   (WO) ................ PCT/KR2019/013981

(51) Int. Cl.
*G10L 25/27* (2013.01)
*G10L 15/08* (2006.01)

(52) U.S. Cl.
CPC .............. *G10L 25/27* (2013.01); *G10L 15/08* (2013.01); *G10L 2015/088* (2013.01)

(58) Field of Classification Search
CPC .... G10L 25/27; G10L 15/08; G10L 2015/088
See application file for complete search history.

(56) References Cited

U.S. PATENT DOCUMENTS

| | | | | |
|---|---|---|---|---|
| 9,495,350 B2* | 11/2016 | John | ....................... | G06F 40/20 |
| 10,387,574 B1* | 8/2019 | Anders | .................... | G06F 40/44 |
| 2014/0019133 A1 | 1/2014 | Bao et al. | | |
| 2014/0303976 A1 | 10/2014 | Grobauer et al. | | |
| 2015/0193425 A1* | 7/2015 | Kusumura | ............ | G06F 40/258 704/9 |
| 2018/0342235 A1* | 11/2018 | Livne | ....................... | G10L 15/04 |
| 2019/0371300 A1* | 12/2019 | Park | ........................ | G10L 15/26 |
| 2020/0027456 A1* | 1/2020 | Kim | ........................ | G10L 15/22 |
| 2021/0118442 A1* | 4/2021 | Poddar | .................. | H04L 51/212 |
| 2021/0335342 A1* | 10/2021 | Yuan | ....................... | G10L 15/08 |

FOREIGN PATENT DOCUMENTS

| | | | |
|---|---|---|---|
| KR | 10-2015-0052600 A | 5/2015 | |
| WO | WO-2017020011 A  * | 2/2017 | |
| WO | WO-2017020011 A1 * | 2/2017 | ............ H04M 3/568 |

OTHER PUBLICATIONS

Tur et al., "The CALO Meeting Assistant System," in IEEE Transactions on Audio, Speech, and Language Processing, vol. 18, No. 6, pp. 1601-1611, Aug. 2010, doi: 10.1109/TASL.2009.2038810. (Year: 2010).*

(Continued)

*Primary Examiner* — Michelle M Koeth (74) *Attorney, Agent, or Firm* — Birch, Stewart, Kolasch & Birch, LLP (57) ABSTRACT

Disclosed are method and apparatus for speech analysis. The speech analysis apparatus and a server are capable of communicating with each other in a 5G communication environment by executing mounted artificial intelligence (AI) algorithms and/or machine learning algorithms. The speech analysis method and apparatus may collect and analyze speech data to build a database of structured speech data.

19 Claims, 5 Drawing Sheets

(56) References Cited

OTHER PUBLICATIONS

Schneider, "Topic Modeling based on Keywords and Context," SIAM International Conference on Data Mining (SDM), 2018, arXiv: 1710.02650v2 [cs.CL]. (Year: 2018).*

Watanabe et al., "Topic tracking language model for speech recognition," Computer Speech & Language, vol. 25, Issue 2, 2011, pp. 440-461, ISSN 0885-2308, https://doi.org/10.1016/j.csl.2010.07.006. (Year: 2011).*

Schellenberg, "Principles of Arrangement," Staff Information Paper No. 18, Published by the National Archives and Records Administration, Washington, DC, 14 pages, Web Version, 1999. (Available at https://www.archives.gov/research/alic/reference/archives-resources/principles-of-arrangement.html). (Year: 1999).*

* cited by examiner

METHOD AND APPARATUS FOR SPEECH ANALYSIS

CROSS-REFERENCE TO RELATED APPLICATION

Pursuant to 35 U.S.C. § 119(a), this application claims the benefit of an earlier filing date and right of priority to PCT International Application No. PCT/KR2019/013981, entitled "Method and apparatus for speech analysis," filed on Oct. 23, 2019, the contents of which are all hereby incorporated by reference herein in their entirety.

BACKGROUND

1. Technical Field

The present disclosure relates to a speech analysis method and apparatus for collecting and analyzing speech data generated in various spaces.

2. Description of Related Art

Speech recognition technology has been actively applied to personalized speech recognition services in conjunction with the full-scale spread of artificial intelligence (AI) technology and Internet of Things (IoT) technology. For example, a user may deliver a command for searching the Internet or creating a schedule to a virtual assistant to which the speech recognition technology is applied, while communicating with the virtual assistant.

Sound generated in a home is embedded with context information of a user, yet there is no way to use such context information for speech recognition. There is thus a need for a speech analysis method and apparatus capable of analyzing various sounds generated in various spaces in the home.

SUMMARY OF THE INVENTION

One aspect of the present disclosure is to provide a speech analysis method capable of analyzing various sounds generated in various spaces.

Another aspect of the present disclosure is to provide a speech analysis apparatus for generating structured speech data by analyzing collected speech data.

The present disclosure is not limited to what has been described above, and other aspects not mentioned herein will be apparent from the following description to one of ordinary skill in the art to which the present disclosure pertains.

A speech analysis method and apparatus according to embodiments of the present disclosure may analyze sounds generated in various spaces in a home in consideration of space, time, and speaker-specific characteristics, and may provide a database storing an analysis result as structured data. In addition, the speech analysis method and apparatus according to the embodiments may perform keyword analysis on speech data collected in the home in view of space, time, and speaker, and may generate and store structured speech data as an analysis result.

To this end, there is provided a speech analysis method according to an embodiment of the present disclosure. The speech analysis method may include dividing speech data into a plurality of segments, aligning the plurality of segments based on meta information of the plurality of segments, extracting a keyword list of each segment, and modeling topic information of each segment based on the keyword list.

Further, there is provided a speech analysis apparatus according to another embodiment of the present disclosure. The speech analysis apparatus may include a memory configured to store speech data, and at least one processor accessible to the memory. The processor may be configured to divide the speech data into a plurality of segments, align the plurality of segments based on meta information of the plurality of segments, extract a keyword list of each segment, and model topic information of each segment based on the keyword list.

In addition to these embodiments, another method and system for implementing the present disclosure, and a computer-readable recording medium storing a computer program for executing the method may be further provided.

Aspects which can be achieved by the present disclosure are not limited what has been disclosed hereinabove, and other aspects can be clearly understood from the following description by those skilled in the art to which the present disclosure pertains.

According to embodiments of the present disclosure, various sounds generated in various spaces may be analyzed in consideration of space, time, and speaker-specific characteristics.

Further, according to embodiments of the present disclosure, keyword analysis may be performed on collected speech data in view of space, time, and speaker to generate and provide structured speech data.

It should be noted that effects of the present disclosure are not limited to the effects of the present disclosure as mentioned above, and other unmentioned effects of the present disclosure will be clearly understood by those skilled in the art from an embodiment described below.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Hereinafter, embodiments disclosed herein will be described in detail with reference to the accompanying drawings, and the same reference numerals are given to the same or similar components and duplicate descriptions thereof will be omitted. In addition, in describing an embodiment disclosed in the present document, if it is determined that a detailed description of a related art incorporated herein unnecessarily obscure the gist of the embodiment, the detailed description thereof will be omitted.

The terminology used herein is used for the purpose of describing particular exemplary embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," " "second," and other numerical terms, are used only to distinguish one element from another element. These terms are generally only used to distinguish one element from another.

Figure 1:
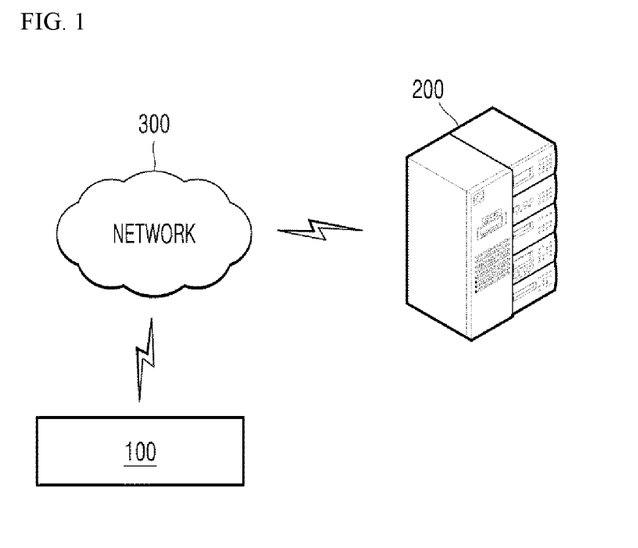
FIG. 1 is an exemplary diagram illustrating a speech analysis environment according to an embodiment of the present disclosure.

FIG. 1 is an exemplary diagram illustrating a speech analysis environment according to an embodiment of the present disclosure.

The speech analysis environment may include a speech analysis apparatus 100, a server 200, and a network 300. The speech analysis apparatus 100 and the server 300 may be connected to each other in a 5G communication environment. In addition, other than the devices illustrated in FIG. 1, various other electronic devices for use in a home or an office may be connected to one another and operate in an Internet of Things (IoT) environment.

The speech analysis apparatus 100 may receive an utterance spoken by a user and analyze the received utterance. In addition, the speech analysis apparatus 100 may recognize the received utterance and provide a speech recognition service based on a recognition result. For example, the speech analysis apparatus 100 may include various electronic devices capable of performing a speech recognition function, such as an artificial intelligence (AI) speaker, a home robot, and a communication robot. In the present embodiment, the speech analysis apparatus 100 may be a desktop computer, smartphone, notebook computer, tablet PC, smart TV, mobile phone, personal digital assistant (PDA), laptop, media player, micro-server, global positioning system (GPS) device, electronic book terminal, digital broadcasting terminal, navigation, kiosk, MP3 player, digital camera, home appliance, and other mobile or immobile computing devices which are operated by a user, but is not limited thereto. In addition, the speech analysis apparatus 100 may be a wearable device having a communication function and a data processing function, such as a watch, glasses, a hair band, or a ring. For example, the speech analysis apparatus 100 may include various home appliances capable of performing a speech recognition function, such as a TV, a washing machine, and an air conditioner. In addition, the speech analysis apparatus 100 may serve as a hub which controls an electronic device that does not have a speech input/output function.

The speech analysis apparatus 100 may autonomously perform a speech analysis function and provide a speech recognition service based on an analysis result, or may transmit speech data to the server 200 and receive a speech analysis result from the server 200.

The server 200 may be a database server, which provides big data required for applying a variety of AI algorithms and data related to speech recognition. In addition, the server 200 may include a web server or an application server so as to remotely control the speech analysis apparatus 100.

AI refers to a field of studying AI or a methodology for creating the same. Moreover, machine learning refers to a field of defining various problems dealing in an AI field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and optionally one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

Machine learning may be classified into supervised learning, unsupervised learning, and reinforcement learning depending on the learning method.

Supervised learning may refer to a method for training the ANN with training data that has been given a label. In addition, the label may refer to a target answer (or a result value) to be inferred by the ANN when the training data is inputted to the ANN. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and the deep learning is one machine learning technique. Hereinafter, the meaning of machine learning includes deep learning.

The server 200 may perform speech recognition and analysis on speech data, and transmit an analysis result to the speech analysis apparatus 100. The server 200 may perform a speech analysis method according to an embodiment of the present disclosure. To this end, the server 200 may receive speech data to be analyzed from the speech analysis apparatus 100, perform respective steps of the speech analysis method according to an embodiment of the present disclosure, and store structured speech data in a memory of the server 200. The server 200 may be a database server that controls management and access with respect to the structured speech data stored in the memory of the server 200. The server 200 may use a natural language processing (NLP) model based on machine learning for speech analysis. The server 200 may transmit, to the speech analysis apparatus 100, a result of modeling topic information acquired as a result of the speech analysis, and the structured speech data.

The network 300 may serve to connect the speech analysis apparatus 100 and the server 200 to each other. The network 300 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 300 may transmit/receive information using short-range communications and/or long-distance communications. Short-range communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 300 may include connection of network elements such as a hub, a bridge, a router, a switch, and a gateway. The network 300 may include one or more connected networks, including a public network such as the Internet and a private network such as a secure corporate private network. For example, the network may include a multi-network environment. Access to the network 300 can be provided via one or more wired or wireless access networks. Furthermore, the network 300 may support the IoT for 5G communication or exchanging and processing information between distributed elements such as objects.

Figure 2:
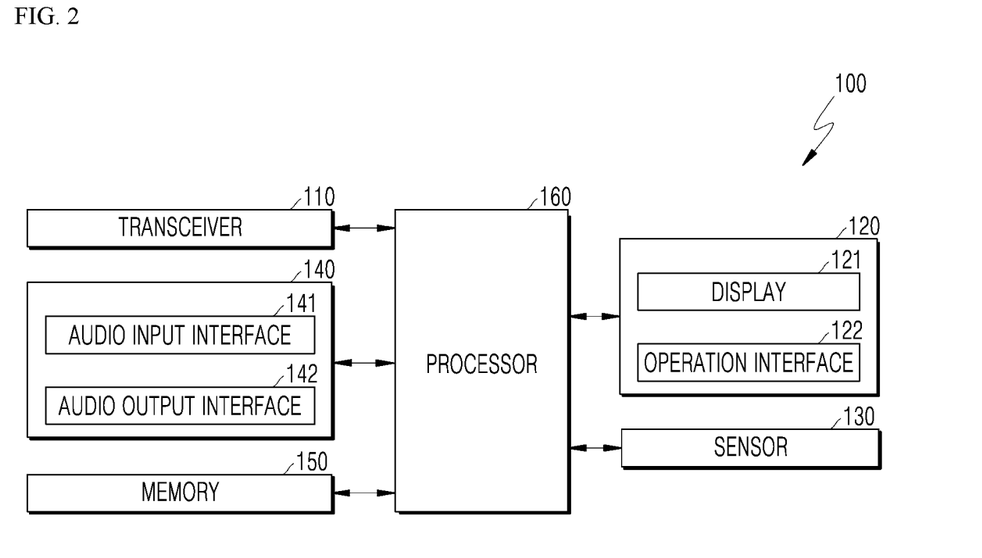
FIG. 2 is a schematic block diagram illustrating a speech analysis apparatus according to an embodiment of the present disclosure.

FIG. 2 is a schematic block diagram illustrating a speech analysis apparatus according to an embodiment of the present disclosure.

The speech analysis apparatus 100 may comprise a transceiver 110, a user interface 120 including a display 121 and an operation interface 122, a sensor 130, an audio processor 140 including an audio input interface 141 and an audio output interface 142, a memory 150, and a processor 160.

The speech analysis apparatus 100 may function as an analysis device that recognizes and analyzes speech data acquired from a user. In addition, the speech analysis apparatus 100 may function as a speech recognition device that recognizes speech data acquired from a user, performs a command indicated by the speech data, and outputs a result of the performance.

In conjunction with the network 300, the transceiver 110 may provide a communication interface required to provide a transmission/reception signal between the speech analysis apparatus 100 and the server 200 in the form of packet data. Further, the transceiver 110 may be a device including hardware and software required to transmit and receive a signal such as a control signal or a data signal, through wired/wireless connection with other network devices. Further, the transceiver 110 may support various kinds of object-to-object intelligent communication (such as IoT, Internet of everything (IoE), and Internet of small things (IoST)) and may support communications such as machine to machine (M2M) communication, vehicle to everything communication (V2X), and device to device (D2D) communication. For example, the transceiver 110 may include network interface devices such as a modem, a transmitter/receiver, and a transceiver.

Under the control of the processor 160, the transceiver 110 may receive speech data that stores a user's utterance from the server 200. The processor 160 may perform the speech analysis method according to an embodiment of the present disclosure on the speech data received through the transceiver 110.

The transceiver 110 may transmit the speech data to the server 200 under the control of the processor 160, and may receive, from the server 200, structured speech data generated as a result of performing speech analysis in response thereto.

Under the control of the processor 160, the display 121 of the user interface 120 may display an operation state of the speech analysis apparatus 100. In one example, the display 121 may form an interlayer structure together with a touch pad in order to constitute a touchscreen. In this case, the display 121 may be also used as the operation interface 122 in which information may be inputted by touch of a user. To this end, the display 121 may be configured as a touch recognition display controller or various input/output controllers. In one example, the touch recognition display controller may provide an output interface and an input interface between the apparatus and the user. The touch recognition display controller may transmit and receive electrical signals to and from the processor 160. In addition, the touch recognition display controller may display a visual output for the user, and the visual output may include texts, graphics, images, video, and a combination thereof. The display 121 may be, for example, a predetermined display member capable of touch recognition, such as an organic light emitting display (OLED), a liquid crystal display (LCD), or a light emitting display (LED).

The operation interface 122 in the user interface 120 may be provided with a plurality of operation buttons (not illustrated), and may transmit a signal corresponding to an inputted button to the processor 160. Such an operation interface 122 may be configured as a sensor, a button, or a switch structure which recognizes a touch or a pressing operation of the user. The operation interface 122 may transmit, to the processor 160, an operation signal that is operated by a user to confirm or change various information related to driving of the speech analysis apparatus 100 displayed on the display 121.

Under the control of the processor 160, the display 121 may output a speech recognition result of the speech analysis apparatus 100. Here, the speech recognition result may include a result of the speech analysis apparatus 100 recognizing an utterance spoken by the user and executing a command according to the recognized utterance.

The sensor 130 may comprise at least one sensor that senses a surrounding situation of the speech analysis apparatus 100.

The sensor 130 may include a position sensor. The position sensor may acquire position data of the speech analysis apparatus 100. For example, the position sensor may include a global positioning system (GPS) sensor and an inertial measurement unit (IMU) sensor. The IMU sensor may include, for example, an acceleration sensor and/or a gyro sensor. The position data acquired by the position sensor may be stored in the memory 150.

The sensor 130 may include a proximity sensor. The proximity sensor may obtain position data of an object (for example, a user) which is located in the vicinity of the speech analysis apparatus 100 by utilizing infrared rays. Furthermore, the location data of the user acquired by the proximity sensor may be stored in the memory 150.

The sensor 130 may include an image sensor. The image sensor may include a camera capable of photographing the surrounding of the speech analysis apparatus 100, and for more efficient photographing, a plurality of image sensors may be provided. For example, the camera may include at least one optical lens, an image sensor (for example, a CMOS image sensor) configured to include a plurality of photodiodes (for example, pixels) on which an image is formed by light passing through the optical lens, and a digital signal processor (DSP) which configures an image based on signals outputted from the photodiodes. The digital signal processor may generate not only a still image, but also a moving image formed by frames configured by a still image. The image captured and obtained by the camera serving as the image sensor may be stored in the memory 150.

Although the sensor 130 is described as the proximity sensor and the image sensor in the present embodiment, the present disclosure is not limited thereto. The sensor 130 may include any sensors capable of sensing the surrounding situation of the speech analysis apparatus 100, for example, including at least one of a lidar sensor, a weight sensing sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environment sensor (for example, a barometer, a hygrometer, a thermometer, a radiation sensor, a thermal sensor, or a gas sensor), or a chemical sensor (for example, an electronic nose, a healthcare sensor, or a biometric sensor). The speech analysis apparatus 100 may combine and utilize pieces of information sensed by at least two sensors among the above-described sensors.

The audio processor 140 may provide an interface for audio input/output and perform required for audio processing.

The audio input interface 141 of the audio processor 140 may acquire a speech input (for example, an utterance and a conversation) of the user. To this end, the audio input interface 141 may comprise one or more microphones (not illustrated). The audio input interface 141 may acquire the speech input of the user through a microphone and transmit the speech input to the processor 160.

The audio input interface 141 may be provided with a plurality of microphones (not illustrated) to more accurately receive a speech input. Here, the plurality of microphones may be respectively disposed at different positions to be spaced apart from each other, and may process the received speech input as an electrical signal. For example, the speech analysis apparatus 100 may analyze speech data generated in a home. To this end, the plurality of microphones of the audio input interface 141 may be respectively disposed in a plurality of spaces in the home, such as a living room, a bedroom, a study room, and a kitchen.

Selectively, the audio input interface 141 may use various noise removal algorithms for removing noise generated in the process of receiving a speech input. In an alternative embodiment, the audio input interface 141 may include various elements configured to process an audio signal, such as a filter (not illustrated) configured to remove noise when the user's spoken utterance is received, and an amplifier (not illustrated) configured to amplify and output a signal outputted from the filter.

The audio output interface 142 of the audio processor 140 may output, under the control of the processor 160, a notification message such as a warning sound, a notification related to an operation mode, an operation state, and an error state, response information corresponding to the user's spoken utterance, and a processing result corresponding to the user's speech input as audio. The audio output interface 142 may convert the electrical signal from the processor 160 into an audio signal and output the audio signal. To this end, the audio output interface 142 may comprise a speaker. The audio output interface 142 may output a speech recognition result of the speech analysis apparatus 100 through the speaker under the control of the processor 160. The speech recognition result may include a result of the speech analysis apparatus 100 executing a command intended by the user's speech input.

The memory 150 may store therein various information required for operations of the speech analysis apparatus 100, and may include a volatile or non-volatile recording medium. For example, a preset wake-up word for determining the presence of a wake-up word in the spoken utterance of the user may be stored in the memory 150. The wake-up word may be set by a manufacturer. For example, "Hi, LG" may be set as the wake-up word, but the user may change the wake-up word. The wake-up word may be inputted to activate the speech analysis apparatus 100, and the speech analysis apparatus 100 which recognizes the wake-up word uttered by the user may be switched to a speech recognition active state.

Under the control of the processor 160, the memory 150 may store speech data received through the audio input interface 141. In addition, the memory 150 may store information sensed by the sensor 130. Under the control of the processor 160, the memory 150 may store various information processed by the speech analysis apparatus 100. The various information processed by the speech analysis apparatus 100 may include, for example, speech data, attribute information of the speech data, a plurality of segments, meta information of the plurality of segments, a keyword list, topic information, and structured speech data.

The memory 150 may include magnetic storage media or flash storage media, without being limited thereto. The memory 150 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The processor 160 may perform speech recognition and analysis on the user's spoken utterance received through the audio input interface 141 and store a result of the speech recognition and analysis in the memory 150. In addition, the processor 160 may recognize the user's spoken utterance and provide a result of executing a command according to the recognized spoken utterance, as visual information through the display 121 or as audio information through the audio output interface 142.

The processor 160 is a sort of central processor, and may drive control software installed in the memory 150 to control an overall operation of the speech analysis apparatus 100. The processor 160 may include all types of devices capable of processing data. Here, the processor 160 may, for example, refer to a data processing device embedded in hardware, which has a physically structured circuitry to perform a function represented by codes or instructions contained in a program. As examples of the data processing device embedded in hardware, a microprocessor, a central processing unit (CPU), a processor core, a multiprocessor, an application-specific integrated circuit (ASIC), a field programmable gate array (FPGA), and the like may be included, but the scope of the present disclosure is not limited thereto. The processor 160 may include one or more processors.

The processor 160 may execute an application program that implements the speech analysis method according to an embodiment of the present disclosure by controlling each component module of the speech analysis apparatus 100.

The processor 160 may control the microphone of the audio input interface 141 to receive the user's speech input, or may control the transceiver 110 to receive the user's speech input.

The processor 160 may divide speech data into a plurality of segments. Here, the speech data may include at least one piece of speech data acquired in at least one space through the microphone of the audio input interface 141.

The processor 160 may access the memory 150, read the speech data stored in the memory 150, and store the plurality of segments generated by dividing the speech data in the memory 150. Here, the processor 160 may divide the speech data at a silent gap in the speech data. The division of the speech data into segments will be described below in detail with reference to step S410 of FIG. 3.

The processor 160 may align the plurality of segments based on meta information of the plurality of segments. Here, the meta information may include start time information, duration information, place information, and speaker information of each segment. The processor 160 may align the plurality of segments based on an alignment reference determined according to a type of meta information of a segment. The alignment of the segments will be described below in detail with reference to step S420 of FIG. 3.

The processor 160 may extract a keyword list of each segment of the plurality of segments. The processor 160 may store the extracted keyword list in the memory 150. To this end, the processor 160 may convert each segment into a text. Specifically, the processor 160 may convert each segment into a text by using an NLP model that executes a speech-to-text (STT) engine stored in the memory 150. The processor 160 may extract, based on the text generated by converting each segment, at least one keyword included in a segment. Here, the processor 160 may store the extracted at least one keyword in the memory 150, as a keyword list of the segment. The extraction of the keyword list will be described below in detail with reference to step S430 of FIG. 3.

The processor 160 may model topic information of the segment based on the keyword list. The processor 160 may store, in the memory 150, the topic information acquired as a result of the modeling. To this end, the processor 160 may determine a topic probability distribution of each segment and determine a topic probability value of at least one keyword included in the keyword list of the segment. The modeling will be described below in detail with reference to step S440 of FIG. 3.

The processor 160 may store structured speech data. The structured speech data may include the meta information, the keyword list, and the topic information of the plurality of segments. The storage of the structured speech data will be described below in detail with reference to step S450 of FIG. 3.

The processor 160 may perform machine learning, such as deep learning, on the speech data so that the speech analysis apparatus 100 performs optimal speech analysis, and the memory 150 may store data used for the machine learning, and result data. For example, the memory 150 may store a machine learning-based NLP model for analyzing the speech data.

The processor 160 may drive an ANN and perform machine learning-based speech analysis using the acquired speech data as input data. For example, the processor 160 may recognize and analyze the speech data by using the machine learning-based NLP model.

Figure 3:
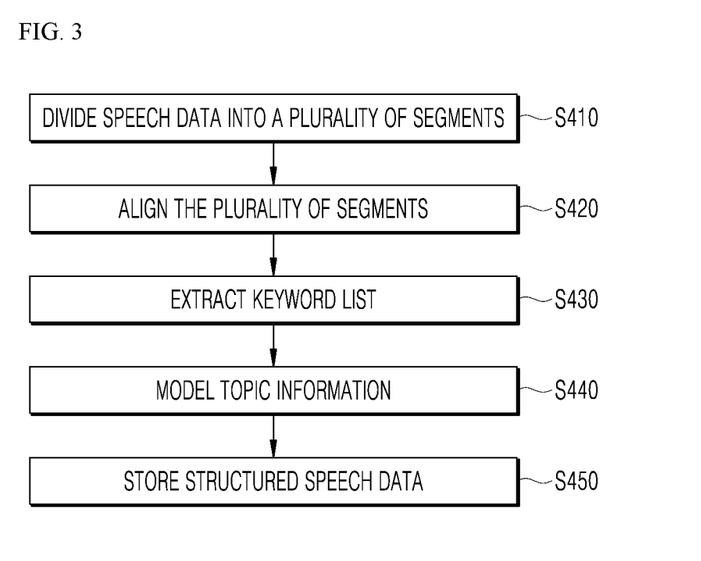
FIG. 3 is a schematic flowchart illustrating a speech analysis method according to an embodiment of the present disclosure.

FIG. 3 is a schematic flowchart illustrating a speech analysis method according to an embodiment of the present disclosure.

The speech analysis method according to an embodiment of the present disclosure may include dividing speech data into a plurality of segments (step S410), aligning the plurality of segments based on meta information of the plurality of segments (step S420), extracting a keyword list of each segment (step S430), and modeling topic information of each segment based on the keyword list (step S440). The above-described analysis method may be performed by the speech analysis apparatus 100 according to an embodiment of the present disclosure.

In step S410, the speech analysis apparatus 100 may divide speech data into a plurality of segments.

The speech analysis apparatus 100 may collect speech data generated in at least one indoor space. The speech data may refer to audio data acquired from sound generated in a space. The speech analysis apparatus 100 may store the speech data in the memory 150 in an audio file format (for example, mp3, aac, rogg, mp4, wma, m4a, flac, wav, and aiff).

The speech analysis apparatus 100 may collect attribute information of the speech data, together with the speech data. In one example, the attribute information of the speech data may include place information about a place where the speech data was acquired, time information about a time when the speech data was acquired, and speaker information of the speech data. The place information about a place where the speech data was acquired may refer to space identification information of a space where a microphone through which the speech data was acquired is disposed. The time information about a time when the speech data was acquired may refer to information about a start time at which the collection of the speech data started, an end time at which the collection of the speech data ended, and a duration of the speech data. The speaker information of the speech data may refer to a speaker who spoke the utterance recorded in the speech data. The speaker may be a person but is not limited thereto. For example, the speaker may include a TV, radio, or an AI assistant driven on a robot or smart device.

When acquiring the speech data, the speech analysis apparatus 100 may acquire the attribute information together with the speech data. For example, the speech analysis apparatus 100 may store and manage the place information about a place where the speech data was acquired based on the space identification information of the space in which the microphone through which the speech data was acquired is disposed. For example, the speech analysis apparatus 100 may store and manage the information about a start time at which the collection of the speech data started, an end time at which the collection of the speech data ended, and a duration of the speech data, as time information of the speech data. For example, the speech analysis apparatus 100 may store and manage the speaker information about the speaker who spoke the utterance recorded in the speech data.

In one example, the speech analysis apparatus 100 may collect speech data generated in each indoor space through the audio input interface 141 (for example, a microphone) disposed in each indoor space, and may store the collected speech data in the memory 150.

To this end, the speech analysis apparatus 100 may assign, to each indoor space, space identification information for identifying each indoor space, and may manage mapping information in which an identifier of a microphone disposed in each indoor space is mapped with space identification information of a corresponding indoor space.

For example, when a first microphone is disposed in a first space (for example, a living room), the speech analysis apparatus 100 may store, in the memory 150, mapping information indicating that the first microphone and the first space are mapped. In addition, the speech analysis apparatus 100 may recognize place information about a place where speech data was acquired based on the mapping information. For example, the speech data collected by the first microphone may store information, which is speech data acquired in the first space mapped with the first microphone, together with the speech data in the memory 150. The above-described place information about a place where speech data was acquired may be included in the attribute information of the speech data.

The speech analysis apparatus 100 may perform speaker recognition while acquiring speech data through the audio input interface 141 disposed in each indoor space. To this end, the speech analysis apparatus 100 may store a pre-registered user's voice in the memory 150. The speech analysis apparatus 100 may recognize the speaker who spoke the utterance recorded in the speech data by using the pre-registered user's voice database stored in the memory 150. The above-described speaker information may be included in the attribute information of the speech data.

In another example, the speech analysis apparatus 100 may receive speech data collected in each indoor space and attribute information of the speech data through the transceiver 110, and may store the received speech data together with the attribute information in the memory 150.

In step S410, the speech analysis apparatus 100 may divide the speech data into a plurality of segments. A segment may refer to a part of the speech data generated by dividing the speech data acquired by the speech analysis apparatus 100 according to a specific reference. The speech analysis apparatus 100 may consider one segment as one conversation.

The speech analysis apparatus 100 may divide the speech data into segments according to whether sound is continuously generated. To this end, the speech analysis apparatus 100 may divide the speech data at a silent gap in the speech data. For example, the silent gap may be a gap in which a volume of sound is less than or equal to a predetermined threshold. For example, the silent gap may be a gap in which there is no sound.

For example, under the control of the processor 160, the speech analysis apparatus 100 may determine whether an audio signal included in the speech data stored in the memory 150 is continuous. When a length value of a gap in which the audio signal is discontinuous is greater than or equal to a predetermined threshold value, the speech analysis apparatus 100 may divide the speech data before and after the discontinuous gap. For example, under the control of the processor 160, the speech analysis apparatus 100 may determine whether a change in a level (that is, a volume of sound) of the audio signal included in the speech data stored in the memory 150 is within a predetermined range. When the level of the audio signal is sharply lowered, and thereafter the original level is not recovered within a predetermined threshold time, the speech analysis apparatus 100 may divide the speech data before and after the gap in which the level of the audio signal is sharply lowered.

In one example, the speech data may include at least one piece of speech data acquired in at least one space. In step S410, the speech analysis apparatus 100 may divide the at least one piece of speech data acquired in at least one space into a plurality of segments. For example, the speech analysis apparatus 100 may divide the at least one piece of speech data acquired in at least one space such as a living room, a kitchen, a study room, or a bedroom in a home into a plurality of segments.

In step S410, the speech analysis apparatus 100 may generate meta information of each segment while dividing the speech data. The meta information of a segment may refer to additional attributes of audio data included in the segment. For example, the meta information of the segment may include start time information, duration information, place information, and speaker information of the segment.

In step S410, the speech analysis apparatus 100 may divide the speech data into a plurality of segments according to the above-described method while reading an audio file in which the speech data is stored from beginning to end. In one example, under the control of the processor 160, the speech analysis apparatus 100 may determine start time information and duration information of each segment based on time information about a time when the speech data was acquired and time information of an audio frame of the speech data among attribute information of the speech data. In one example, under the control of the processor 160, the speech analysis apparatus 100 may determine place information about a place where the speech data was acquired among the attribute information of the speech data, as place information of a plurality of segments generated by dividing the speech data. In one example, under the control of the processor 160, the speech analysis apparatus 100 may recognize a pre-registered speaker from each segment and determine at least one recognized speaker as speaker information of a segment.

In step S420, the speech analysis apparatus 100 may align the plurality of segments based on the meta information of the plurality of segments generated in step S410.

In step S420, the speech analysis apparatus 100 may align the plurality of segments according to an alignment reference determined according to a type of meta information to be used for the alignment of the plurality of segments. In step S420, the speech analysis apparatus 100 may align the plurality of segments according to a plurality of alignment references determined according to the type of meta information. The speech analysis apparatus 100 may align the plurality of segments at least once according to an alignment reference determined for each type of meta information. For example, the speech analysis apparatus 100 may perform at least one of the alignment of the plurality of segments according to the start time information among the meta information, the alignment of the plurality of segments according to the place information among the meta information, or the alignment of the plurality of segments according to the speaker information among the meta information, or may perform all of the alignments described above sequentially or simultaneously.

When the start time information of each segment among the meta information is used to align the plurality of segments, the speech analysis apparatus 100 may align the plurality of segments based on the start time information of each segment. For example, the speech analysis apparatus 100 may align the plurality of segments in chronological order of the start time information of each segment. When the place information of each segment among the meta information is used to align the plurality of segments, the speech analysis apparatus 100 may classify the plurality of segments according to the place information of each segment, and may align, based on the start time information of each segment, the plurality of segments classified according to the place information by place. For example, the speech analysis apparatus 100 may align the plurality of segments classified according to the place information by place, in chronological order of the start time information of each segment.

When the speaker information of each segment among the meta information is used to align the plurality of segments, the speech analysis apparatus 100 may classify the plurality of segments according to the speaker information of each segment, and may align, based on the start time information of each segment, the plurality of segments classified according to the speaker information by speaker. For example, the speech analysis apparatus 100 may align the plurality of segments classified according to the speaker information by speaker, in chronological order of the start time information of each segment.

In step S430, the speech analysis apparatus 100 may extract a keyword of each segment of the plurality of segments aligned based on the meta information in step S420. To this end, in step S430, the speech analysis apparatus 100 may convert each segment into a text and extract at least one keyword included in each segment based on the converted text.

In step S430, the processor 160 of the speech analysis apparatus 100 may extract a keyword by using at least one of a speech-to-text (STT) engine for converting speech included in each segment of the plurality of segments aligned in step S420 into a string, or an NLP engine for acquiring intention information of natural language.

In an embodiment, the at least one of the STT engine or the NLP engine may be composed of ANNs, some of which are trained according to a machine learning algorithm. In addition, at least one of the STT engine or the NLP engine may be trained by the processor 160 or a separate learning processor, by a learning processor of the server 200, or by distributed processing thereof.

In step S430, the processor 160 may remove unnecessary words such as postpositions from the string acquired from each segment, and may extract nouns, verbs, and adjectives as keywords.

In step S440, the speech analysis apparatus 100 may model topic information of each segment based on a keyword list extracted in step S430. To this end, the speech analysis apparatus 100 may determine a topic probability distribution of each segment and determine a topic probability value of at least one keyword included in the keyword list extracted in step S430.

The topic information, which is information about a topic of an utterance, may be represented as a probability distribution of a topic. In one example, the speech analysis apparatus 100 may perform topic information modeling on the keyword list in step S440 to acquire a topic probability distribution of each segment and a topic probability value of the keyword. To this end, the speech analysis apparatus 100 may model the topic information by using latent Dirichlet allocation (LDA). The topic information modeling will be described below in detail with reference to FIG. 7.

In addition, the speech analysis method according to an embodiment of the present disclosure may further include storing structured speech data (step S450).

In step S450, the speech analysis apparatus 100 may store the structured speech data in the memory 150, based on a result of the modeling performed in step S440. Here, the structured speech data may include the meta information of the plurality of segments generated in step S410, the keyword list of each segment extracted in step S430, and the topic information acquired in step S440. Step S450 will be described below in detail with reference to FIG. 8.

Figure 4:
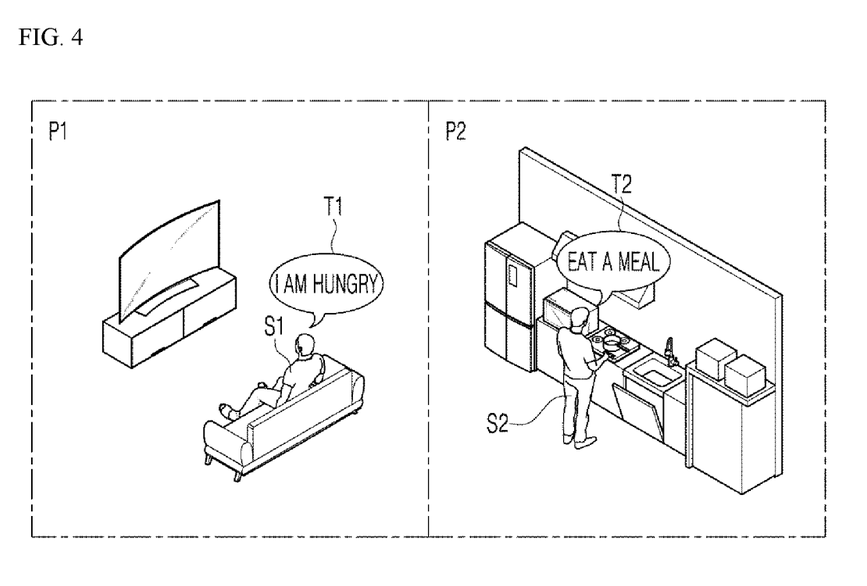
FIG. 4 is an exemplary diagram illustrating a speech analysis method according to an embodiment of the present disclosure.
Figure 5:
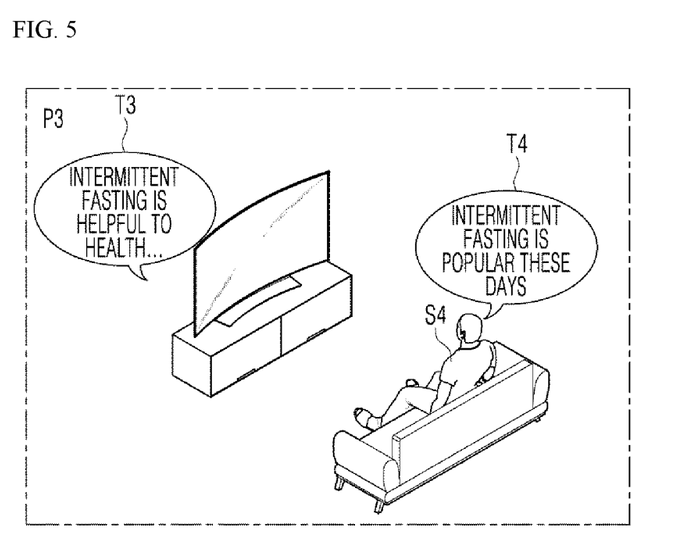
FIG. 5 is an exemplary diagram illustrating a speech analysis method according to an embodiment of the present disclosure.
Figure 6:
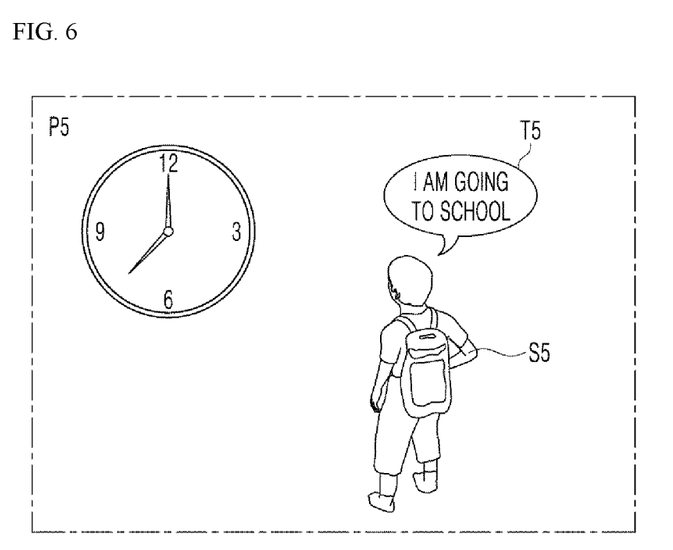
FIG. 6 is an exemplary diagram illustrating a speech analysis method according to an embodiment of the present disclosure.

FIGS. 4 to 6 are exemplary diagrams illustrating a speech analysis method according to an embodiment of the present disclosure.

FIG. 4 is an exemplary diagram illustrating a speech analysis process for conversations acquired at a plurality of places.

In the example of FIG. 4, it is assumed that a first speaker S1 speaks a first utterance T1 (for example, "I am hungry") in a living room, which is a first place P1. Subsequently, it is assumed that a second speaker S2 speaks a second utterance T2 (for example, "Eat a meal") in a kitchen, which is a second place P2.

The speech analysis apparatus 100 may collect speech data including the first utterance T1 and the second utterance T2, and attribute information (time information, place information, and speaker information) of the speech data at the first place P1 and the second place P2.

The speech analysis apparatus 100 may divide the collected speech data into a plurality of segments according to step S410 of FIG. 3. The first utterance T1 and the second utterance T2 may belong to the same segment or may be divided into different segments depending on the presence or absence of a silence gap. In this process, the speech analysis apparatus 100 may also acquire meta information of the plurality of segments, as described above in step S410 of FIG. 3.

The speech analysis apparatus 100 may align the plurality of segments based on the meta information of the plurality of segments according to step S420 of FIG. 3. For example, the plurality of segments may be aligned in chronological order of start time information of each segment. Here, the speech analysis apparatus 100 may align the plurality of segments generated at a plurality of places (for example, P1 and P2) based on the start time information, without considering place information of each segment. Here, the speech analysis apparatus 100 may align the plurality of segments including utterances of a plurality of speakers (for example, S1 and S2) based on the start time information, without considering speaker information of each segment.

Thus, although separated in terms of space, it is possible to analyze a conversation on a single subject in terms of time.

The speech analysis apparatus 100 may extract a keyword list of each segment according to step S430 of FIG. 3. For example, in the example of FIG. 4, "hungry," "meal," and "eat" may be included in a keyword list of a corresponding segment.

Subsequently, the speech analysis apparatus 100 may model topic information according to step S440 of FIG. 3, and may additionally store structured speech data in the memory 150 according to step S450.

FIG. 5 is an exemplary diagram illustrating a speech analysis process for a conversation acquired at one place.

In the example of FIG. 5, it is assumed that a third speaker S3 speaks a third utterance T3 (for example, "Intermittent fasting is helpful to health") in a living room, which is a third place P3. Subsequently, it is assumed that a fourth speaker S4 speaks a fourth utterance T4 (for example, "Intermittent fasting is popular these days") at the same third place P3.

The speech analysis apparatus 100 may collect speech data including the third utterance T3 and the fourth utterance T4 and attribute information (time information, place information, and speaker information) of the speech data at the third place P3.

The speech analysis apparatus 100 may divide the collected speech data into a plurality of segments according to step S410, with reference to FIG. 3. The third utterance T3 and the fourth utterance T4 may belong to the same segment or may be divided into different segments depending on the presence or absence of a silence gap. In this process, the speech analysis apparatus 100 may also acquire meta information of the plurality of segments, as described above in connection with step S410 of FIG. 3.

The speech analysis apparatus 100 may align the plurality of segments based on the meta information of the plurality of segments according to step S420 of FIG. 3. For example, the plurality of segments may be aligned in chronological order of start time information of each segment. Here, the speech analysis apparatus 100 may align the plurality of segments generated at one place (for example, P3) based on the start time information. Thus, it possible to analyze a conversation occurring in a specific space. Here, the speech analysis apparatus 100 may align the plurality of segments including utterances of a plurality of speakers (for example, S3 and S4) based on the start time information, without considering speaker information of each segment.

The speech analysis apparatus 100 may extract a keyword list of each segment according to step S430 of FIG. 3. For example, in the example of FIG. 5, "'health," "intermittent," "fasting," and "popular" may be included in a keyword list of a corresponding segment.

Subsequently, the speech analysis apparatus 100 may model the topic information according to step S440, with reference to FIG. 3, and may additionally store structured speech data in the memory 150 according to step S450.

FIG. 6 is an exemplary diagram illustrating a speech analysis process for an utterance of one speaker.

In the example of FIG. 6, it is assumed that a fifth speaker S5 speaks a fifth utterance T5 (for example, "I am going to school") at a front entrance, which is a fifth place P5.

The speech analysis apparatus 100 may collect speech data including the fifth utterance T5 and attribute information (time information, place information, and speaker information) of the speech data at the fifth place P5.

The speech analysis apparatus 100 may divide the collected speech data into a plurality of segments according to step S410, with reference to FIG. 3. In this process, the speech analysis apparatus 100 may also acquire meta information of the plurality of segments as described above in connection with step S410 of FIG. 3. The fifth speech T5 may be divided into one segment.

The speech analysis apparatus 100 may align the plurality of segments based on the meta information of the plurality of segments according to step S420 of FIG. 3. For example, the plurality of segments may be aligned in chronological order of start time information of each segment. Here, the speech analysis apparatus 100 may align, based on the start time information, a segment including an utterance of one speaker (for example, S5) among a plurality of segments generated from speech data collected at a plurality of places (for example, P1 and P2 with reference to FIG. 4, and P5 with reference to FIG. 5), without considering place information. Thus, it is possible to analyze a periodic pattern of a specific speaker's utterance. For example, the speech analysis apparatus 100 may determine the specific speaker's repeated utterances by place and time, and may infer the speaker's life patterns from the repeated utterances.

The speech analysis apparatus 100 may extract a keyword list of each segment according to step S430 of FIG. 3. For example, in the example of FIG. 5, "school," and "I am going to" may be included in the keyword list of the corresponding segment.

Subsequently, the speech analysis apparatus 100 may model the topic information according to step S440 with reference to FIG. 3, and additionally store structured speech data in the memory 150 according to step S450.

Figure 7:
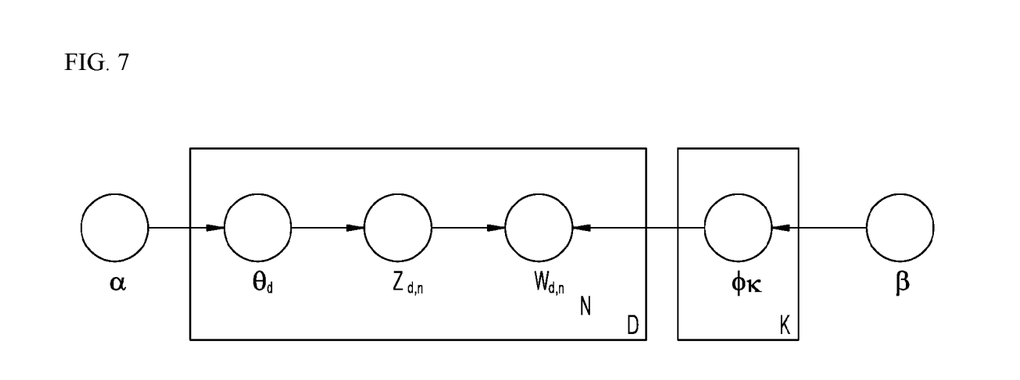
FIG. 7 is a diagram illustrating a topic information acquisition process of a speech analysis method according to an embodiment of the present disclosure.

FIG. 7 is a diagram illustrating a topic information acquisition process of a speech analysis method according to an embodiment of the present disclosure.

The speech analysis apparatus 100 may model topic information of a segment in step S440 of FIG. 3. The topic information, which is information about a probability distribution of a segment and a topic of a keyword included in each segment, may include a topic probability distribution of each segment and a topic probability value of the keyword.

The speech analysis apparatus 100 may determine the topic probability distribution of each segment and determine a topic probability value of at least one keyword included in a keyword list of each segment. Here, the topic probability distribution of a segment may refer to a probability distribution vector ($\Theta_d$, to be described below) of a topic of the segment. The topic probability value of a keyword, which is a value determined from a word weight vector ($\varphi_k$, to be described below) of a topic k, may correspond to $Z_{d,n}$, to be described below.

In one example, the speech analysis apparatus 100 may model the topic information by using latent Dirichlet allocation (LDA). LDA, which is a probabilistic model for topics included in a given document, may estimate a distribution of words by topic and a distribution of topics by document. In the speech analysis method according to an embodiment of the present disclosure, LDA may be used to model the topic information included in a segment.

In FIG. 7, D may represent the total number of segments, K may represent the total number of topics, and N may represent the number of keywords of a d-th segment. α and β are hyperparameters of which values are specified experimentally, and the speech analysis apparatus 100 may estimate, by using LDA, latent variables ($\Theta_d$, $\varphi_k$, and $Z_{d,n}$) other than α and β.

$\varphi_k$ may be a vector representing a word weight of a k-th topic. For example, $\varphi_2$ may be a vector representing a weight of a word corresponding to a second topic. $\Theta_d$ may be a vector representing a weight of a topic included in a d-th document. For example, $\Theta_1$ may be a vector representing a weight of a topic included in a first segment. According to the assumption of the LDA, it is assumed that $\Theta_d$ and $\varphi_k$ follow a Dirichlet distribution.

$Z_{d,n}$ may serve to allocate a topic of a n-th word of the d-th document. $Z_{d,n}$ may be determined based on $\Theta_d$. For example, $Z_{1,5}$ may allocate a topic of a fifth word of the first segment based on $\Theta_1$ representing the weight of the topic of the first segment.

$W_{d,n}$ may serve to allocate the n-th word of the d-th document. $W_{d,n}$ may be determined based on $\varphi_k$ and $Z_{d,n}$. For example, $W_{1,5}$ may determine the fifth word of the first segment according to $\varphi_t$, which is a weight of a word of topic t determined by $Z_{1,5}$.

The speech analysis apparatus 100 may inversely estimate latent variables (word distribution $\varphi_k$ of a topic and topic distribution $\Theta_d$ of a document) based on each keyword ($W_{d,n}$) included in a keyword list of each segment by using LDA. In this process, the speech analysis apparatus 100 may use a Gibbs sampling technique.

Figure 8:
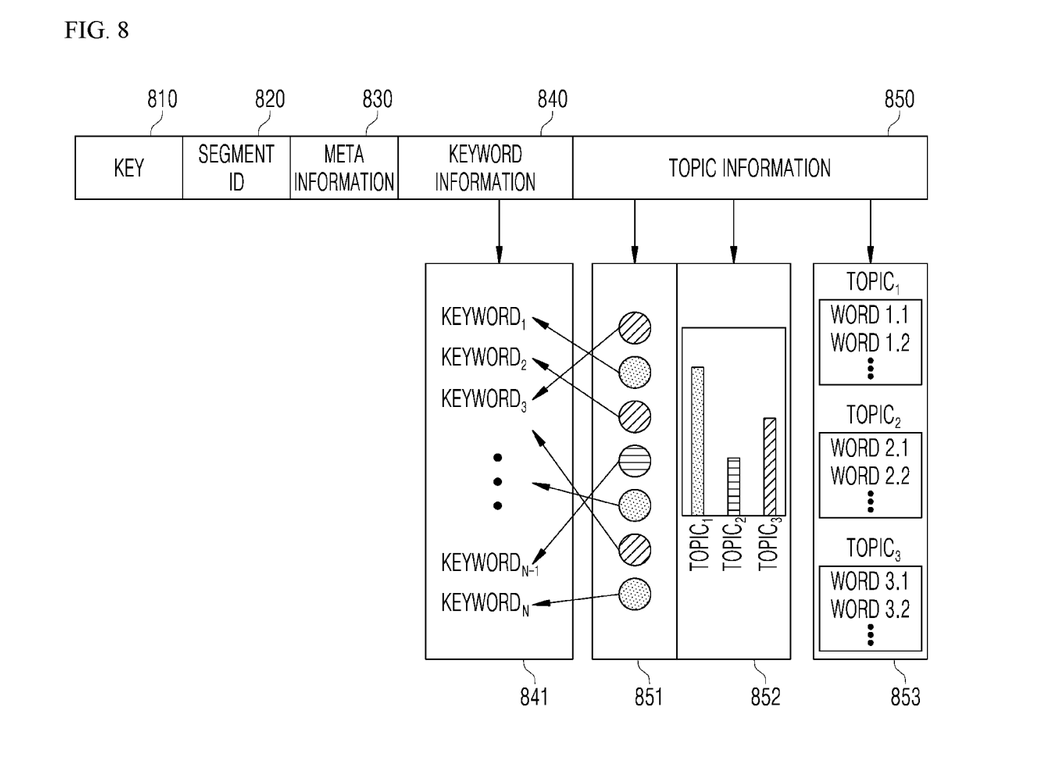
FIG. 8 is a diagram illustrating structured speech data according to an embodiment of the present disclosure.

FIG. 8 is a diagram illustrating structured speech data according to an embodiment of the present disclosure.

The speech analysis apparatus 100 may store the structured speech data in step S450 of FIG. 3. The structured speech data may store structured data by segment.

In one example, the structured speech data may include a key value 810 and a segment ID 820 of data. In one example, the structured speech data may include meta information 830 of a plurality of segments generated in step S410, keyword information 840 including a keyword list 841 of each segment extracted in step S430, and topic information 850 acquired in step S440, with reference to FIG. 3. The keyword information 840 may include the keyword list 841 of a segment. The topic information 850 may include a topic probability distribution 852 of the segment. The topic information 850 may include a topic probability value 851 of each keyword of the keyword list 841 of the segment and a word weight 853 of each topic. In addition, the topic information 850 may store information about topic association between segments. Here, the topic association may be determined according to a similarity between vectors $\Theta_d$ representing the topic probability distribution of the segment.

The speech analysis apparatus 100 may store a database of the structured speech data in the memory 150 or in a storage of the server 200.

Figure 9:
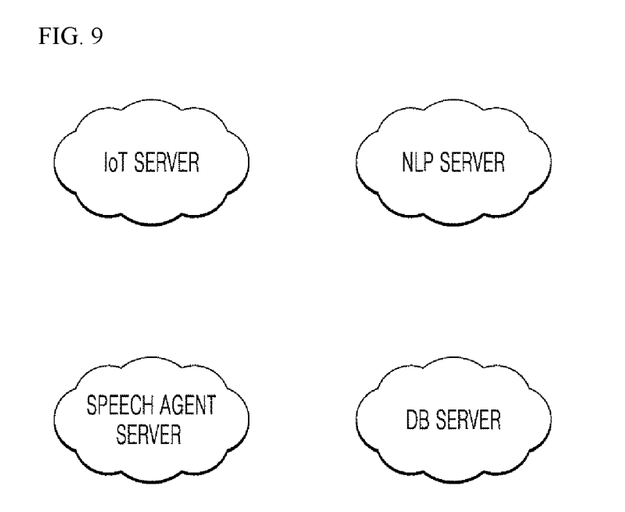
FIG. 9 illustrates examples of utilizing structured speech data according to an embodiment of the present disclosure.

FIG. 9 illustrates examples of utilizing structured speech data according to an embodiment of the present disclosure.

In one example of FIG. 9, a database of structured speech data constructed according to an embodiment of the present disclosure may be utilized in a home appliance including a TV, a home robot, an air conditioner, and a refrigerator, or an IoT server controlling the home appliance. The home appliance or the IoT server controlling the home appliance may predict, based on the database of the structured speech data, a function required by a user according to the user's life pattern, and may generate a message for suggesting the predicted function without the user's command, and provide the message to the user. For example, the home appliance or the IoT server may seek a set of segments in which speaker information included in meta information of a segment stored in the database of the structured speech data is user A, determine a segment having high topic association among the set of segments as a repetitive pattern of user A, and generate a message to be suggested to user A based on a keyword list included in the segment having high association. For example, when user A returns home at 7:00 pm on a weekday and utters "Turn on the TV", a set of segments including speaker information (user A), time information (7:00 pm on a weekday), and place information (living room) as meta information may be structured and stored in the database. In this case, the IoT server or the home appliance such as a TV or home robot may generate, based on a keyword list (a keyword list including "TV" and "turn on") included in the set of segments, a message indicating "Should I turn on the TV?" in the living room at 7:00 pm on a weekday, and may provide the message to user A.

In one example of FIG. 9, the database of the structured speech data constructed according to an embodiment of the present disclosure may be utilized in a speech agent server. In a similar manner to the example described above with respect to the IoT server described above, the speech agent server may analyze, based on a database of structured speech data, patterns of utterances collected in a home by place information, time information, and speaker information included in meta information, and may provide and recommend information necessary for a user according to an utterance pattern before the user speaks.

In one example of FIG. 9, the database of the structured speech data constructed according to an embodiment of the present disclosure may be utilized in an NLP server. For example, the NLP server may analyze, based on a database of structured speech data, patterns of utterances collected in a home by place information, time information, and speaker information, and when an intention of a user's utterance is not clear or automatic speech recognition (ASR) fails, the NLP server may amend/correct the ASR/NLP result of the user's utterance based on the analyzed utterance pattern.

In one example of FIG. 9, the database of the structured speech data constructed according to an embodiment of the present disclosure may be utilized in a database server for retrieving past conversation records. For example, when a user does not remember past utterances, the user may access the database of the structured speech data through the database server to retrieve the past utterances based on meta information.

The example embodiments described above may be implemented through computer programs executable through various components on a computer, and such computer programs may be recorded on computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

While the specific exemplary embodiments of the present disclosure have been described above and illustrated, it will be understood by those skilled in the art that the present disclosure is not limited to the described exemplary embodiments, and various modifications and alterations may be made without departing from the spirit and the scope of the present disclosure. Therefore, the scope of the present disclosure is not limited to the above-described exemplary embodiments, but shall be defined by the technical thought as recited in the following claims.

What is claimed is:

1. A speech analysis method, comprising:
    dividing speech data into a plurality of segments;
    aligning the plurality of segments based on meta information of the plurality of segments;
    extracting a keyword list of each segment;
    modeling topic information of each segment based on the keyword list, wherein the modeling of the topic information of each segment comprises determining a topic probability distribution of each segment and determining a topic probability value of at least one keyword included in the keyword list based on the topic probability distribution;
    generating structured speech data, wherein the structured speech data comprises the meta information, the keyword list, the topic probability distribution of each segment, the topic probability value of at least one keyword included in the keyword list based on the topic probability distribution, and information about topic association determined according to a similarity between vectors representing the topic probability distribution of each segment;
    predicting, based on the structured speech data, a function required by a user according to a repetitive pattern of the user;
    generating a message for suggesting the predicted function without a user command; and
    providing the message to the user,
    wherein the predicting the function required by the user comprises:
        seeking a set of segments in which speaker information included in the meta information of the structured speech data is the user; and
        determining a segment having a high topic association among the set of segments as the repetitive pattern of the user, and
    wherein the generating the message generates the suggested message to the user based on the keyword list included in the segment having high topic association.

2. The speech analysis method of claim 1, wherein the speech data comprises at least one piece of speech data acquired in at least one space.

3. The speech analysis method of claim 1, wherein the dividing the speech data comprises dividing the speech data at a silent gap in the speech data.

4. The speech analysis method of claim 1, wherein the meta information comprises start time information, duration information, place information, and the speaker information of each segment.

5. The speech analysis method of claim 1, wherein the aligning the plurality of segments comprises aligning the plurality of segments based on an alignment reference determined according to a type of the meta information.

6. The speech analysis method of claim 5, wherein
    the meta information comprises start time information of each segment, and
    the aligning the plurality of segments based on the alignment reference comprises aligning the plurality of segments in chronological order of the start time information.

7. The speech analysis method of claim 5, wherein
    the meta information comprises place information and start time information of each segment, and
    the aligning the plurality of segments based on the alignment reference comprises:
        classifying the plurality of segments according to the place information; and
        aligning the plurality of segments classified according to the place information by place in chronological order of the start time information.

8. The speech analysis method of claim 5, wherein
    the meta information comprises the speaker information and start time information of each segment, and
    the aligning the plurality of segments based on the alignment reference comprises:
        classifying the plurality of segments according to the speaker information; and
        aligning the plurality of segments classified according to the speaker information by speaker in chronological order of the start time information.

9. The speech analysis method of claim 1, wherein the extracting the keyword list comprises:
    converting each segment into a text; and
    extracting, based on the text, at least one keyword included in the segment.

10. The speech analysis method of claim 1, wherein the modeling the topic information of each segment comprises modeling the topic information by using latent Dirichlet allocation (LDA).

11. The speech analysis method of claim 1, further comprising storing the structured speech data.

12. A speech analysis apparatus, comprising:
    a memory configured to store speech data; and
    at least one processor accessible to the memory,
    wherein the processor is configured to:
        divide the speech data into a plurality of segments;
        align the plurality of segments based on meta information of the plurality of segments;
        extract a keyword list of each segment;
        model topic information of each segment based on the keyword list, wherein the topic information comprises a topic probability distribution of each segment and a topic probability value of at least one keyword included in the keyword list based on the topic probability distribution, for the modeling;

generate structured speech data, wherein the structured speech data comprises the meta information, the keyword list, the topic probability distribution of each segment, the topic probability value of at least one keyword included in the keyword list based on the topic probability distribution, and information about a topic association determined according to a similarity between vectors representing the topic probability distribution of each segment;

seek a set of segments in which speaker information included in the meta information of the structured speech data is a user;

determine a segment having high topic association among the set of segments as a repetitive pattern of the user;

predict a function required by the user according to the repetitive pattern;

generate a message for suggesting to the user based on the keyword list included in the segment having high topic association according to the predicted function without a user command; and provide the message to the user.

13. The speech analysis apparatus of claim 12, wherein the speech data comprises at least one piece of speech data acquired in at least one space.

14. The speech analysis apparatus of claim 12, wherein the processor is further configured to divide the speech data at a silent gap in the speech data.

15. The speech analysis apparatus of claim 12, wherein the meta information comprises start time information, duration information, place information, and the speaker information of each segment.

16. The speech analysis apparatus of claim 12, wherein the processor is further configured to convert each segment to a text and extract at least one keyword included in the segment based on the text, so as to extract the keyword list.

17. The speech analysis apparatus of claim 12, wherein the processor is further configured to store the structured speech data in the memory.

18. The speech analysis method of claim 1, further comprising:

analyzing, based on the structured speech data, patterns of utterances included in the meta information; and providing information necessary for the user according to an utterance pattern before the user speaks.

19. The speech analysis method of claim 18, further comprising when an intention of an utterance of the user is not clear or when automatic speech recognition (ASR) fails, correcting a result of the ASR result of the utterance based on the analyzed patterns of utterances.

* * * * *